(12) United States Patent
Herges et al.

(10) Patent No.: US 11,299,134 B2
(45) Date of Patent: Apr. 12, 2022

(54) ELECTROPNEUMATIC BRAKE SYSTEM HAVING A TEST MODE FOR THE PNEUMATIC BACKUP BRAKE CIRCUIT

(71) Applicant: KNORR-BREMSE SYSTEME FUER NUTZFAHRZEUGE GMBH, Munich (DE)

(72) Inventors: Michael Herges, Munich (DE); Martin Vorreiter, Vaihingen (DE); Frank Werner, Ditzingen (DE); Matthias Reichert, Hemmingen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 240 days.

(21) Appl. No.: 16/647,835

(22) PCT Filed: Sep. 13, 2018

(86) PCT No.: PCT/EP2018/074827
§ 371 (c)(1),
(2) Date: Mar. 16, 2020

(87) PCT Pub. No.: WO2019/057615
PCT Pub. Date: Mar. 28, 2019

(65) Prior Publication Data
US 2020/0276962 A1    Sep. 3, 2020

(30) Foreign Application Priority Data
Sep. 20, 2017  (DE) .................... 10 2017 121 761.4

(51) Int. Cl.
*B60T 8/90* (2006.01)
*B60T 8/171* (2006.01)
(Continued)

(52) U.S. Cl.
CPC .............. *B60T 8/90* (2013.01); *B60T 8/171* (2013.01); *B60T 8/885* (2013.01); *B60T 13/683* (2013.01);
(Continued)

(58) Field of Classification Search
CPC ........... B60T 8/90; B60T 13/683; B60T 17/22
See application file for complete search history.

(56) References Cited

U.S. PATENT DOCUMENTS

| 4,861,115 A | 8/1989 | Petersen |
|---|---|---|
| 6,354,671 B1 | 3/2002 | Feldmann et al. |
| 2001/0033105 A1 | 10/2001 | Frank et al. |

FOREIGN PATENT DOCUMENTS

| CN | 104411552 A | * | 3/2015 | .............. G01M 3/26 |
|---|---|---|---|---|
| DE | 3501179 A1 |  | 7/1986 | |

(Continued)

OTHER PUBLICATIONS

International Search Report dated Dec. 20, 2018, of the corresponding International Application PCT/EP2018/074827.

*Primary Examiner* — Vishal R Sahni
(74) *Attorney, Agent, or Firm* — Norton Rose Fulbright US LLP; Gerard Messina

(57) ABSTRACT

An electropneumatic brake system (EBS) of a vehicle, which electronically controls a brake-pressure, including: a) a service-brake actuating-element, which is actuatable by a driver, of a service-brake-actuating-device, which has an electrical-channel and at least one pneumatic-channel, wherein, depending on the actuation of the service-brake-actuating-element, an electrical-brake-request-signal, representing a setpoint-brake-pressure, is generated in the electrical-channel and a pneumatic-backup-pressure is generated in the pneumatic-channel; b) a first electronic-control-sys-
(Continued)

tem, which, depending on a brake-request-signal output by the electrical-channel, outputs an electrical-brake-control-signal; c) at least one electropneumatic-pressure-control-module, which, depending on the electrical-brake-control-signal, outputs an actual-brake-pressure, in the course of a brake-pressure-control adjusts the actual-brake-pressure to the setpoint-brake-pressure and inputs this into at least one pneumatic-brake-actuator; d) wherein the pressure-control-module includes at least one electromagnetic-control-valve-device (EV, AV), at least one relay-valve (RLV), at least one electromagnetic-backup-solenoid-valve (BV), a second electronic-control-system and at least one pressure-sensor (DS), wherein, depending on the electrical-brake-control-signal, the electromagnetic-control-valve-device (EV, AV) generates a control-pressure for a control-input of the relay-valve (RLV), which, depending on the control-pressure, generates an actual-brake-pressure for the at least one pneumatic-brake-actuator, which the pressure-sensor (DS) measures/reports to the second electronic-control-system of the pressure-control-module, e) wherein the electromagnetic-control-valve-device (EV, AV) and the at least one electromagnetic-backup-solenoid-valve (BV) are electrically-controlled by the second electronic-control system, f) wherein the electromagnetic-backup-solenoid-valve (BV) is connected by an input to the pneumatic-channel and by an output to the control-input of the relay-valve (RLV) and can be switched between a pass-through-position, in which the input is connected to the output, and a shut-off position, in which the input is shut-off with respect to the output, g) wherein the electromagnetic-control-valve-device (EV, AV) connects the control-input of the relay-valve (RLV) to a pressure-sink or to a compressed-air-supply or shuts it off from the pressure-sink and from the compressed-air-supply, h) wherein a pneumatic-backup-brake-circuit of the electropneumatic-brake-system includes at least the pneumatic-channel of the service-brake-actuating-device, the relay-valve (RLV), the at least one electromagnetic-backup-solenoid-valve (BV) and at least one pneumatic-line connecting the at least one pneumatic-channel to the input of the at least one electromagnetic-backup-solenoid-valve (BV), and i) wherein an electrical-brake-circuit of the electropneumatic-brake-system includes at least the electrical-channel of the service-brake-actuating-device, the first electronic-control-system, the second electronic-control-system, the electromagnetic-control-valve-device (EV, AV), the at least one electromagnetic-backup-solenoid-valve (BV), the relay-valve (RLV) and the pressure-sensor (DS), j) wherein test routines of a test-mode that are configured so that the following test-mode-conditions are cumulatively satisfied when the electrical-brake-circuit is intact and the test-mode is activated are implemented in the first electronic-control-system and/or in the second electronic-control-system: j1) when a vehicle is being driven, the service-brake-actuating-device is actuated by the driver so that a partial-braking, deviating from emergency-braking or full-braking, is performed, and j2) a difference between the backup-pressure generated in the pneumatic-channel and a first pressure-value is greater than the actual-brake-pressure measured by the at least one pressure-sensor (DS), k) wherein the brake-pressure-control ends and the electromagnetic-control-valve-device (EV, AV) and the electromagnetic-backup-solenoid-valve (BV) are switched into a test-switching-state, in which the control-input of the relay-valve (RLV) is shut-off by the electromagnetic-control-valve-device (EV, AV) from the compressed-air-supply and from the pressure-sink and the electromagnetic-backup-solenoid-valve (BV) is switched from the shut-off-position into the pass-through-position, and l) if the pressure-gradient of the brake-pressure measured by the at least one pressure-sensor (DS), l1) is greater than zero, a first signal, representing an intact-backup-brake-circuit, is generated, or l2) is equal to zero or less than zero, a second signal, representing a defective backup-brake-circuit, is generated, or m) then a difference between the backup-pressure generated in the pneumatic-channel and a second pressure-value is greater than the actual-brake-pressure measured by the pressure-sensor (DS), the second-signal, representing a defective backup-brake-circuit, is generated.

15 Claims, 3 Drawing Sheets

(51) Int. Cl.
  *B60T 8/88*   (2006.01)
  *B60T 13/68*  (2006.01)
  *B60T 17/22*  (2006.01)
(52) U.S. Cl.
  CPC ......... *B60T 17/22* (2013.01); *B60T 2270/402* (2013.01); *B60T 2270/406* (2013.01)

(56) References Cited

FOREIGN PATENT DOCUMENTS

| DE | 19903265 A1 | 8/2000 | |
|---|---|---|---|
| DE | 102015110386 A1 | 12/2016 | |
| EP | 0187901 A2 | 7/1986 | |
| EP | 0357922 A2 | 3/1990 | |
| WO | 2017001315 A1 | 1/2017 | |
| WO | 2017036569 A1 | 3/2017 | |
| WO | WO-2017071991 A1 * | 5/2017 | ............ B60T 11/102 |
| WO | WO-2018172340 A1 * | 9/2018 | .............. B60T 8/362 |

* cited by examiner

ELECTROPNEUMATIC BRAKE SYSTEM HAVING A TEST MODE FOR THE PNEUMATIC BACKUP BRAKE CIRCUIT

FIELD OF THE INVENTION

The present invention relates to an electropneumatic brake system (EBS) of a vehicle, which electronically controls a brake pressure, and to a vehicle having such a brake system.

BACKGROUND INFORMATION

Important to a safety concept of an electropneumatic brake system (EBS) which electronically controls a brake pressure is that the leak-tightness of the pneumatic backup brake circuit provided as an underlying safety level for the electrical brake circuit, and in particular the pneumatic lines thereof, in particular those of the service brake actuating device to the pressure control module or modules and to the trailer control module, should be checked, for example regularly, for example once every ignition cycle, to ensure that this redundancy is available.

At present, a test mode for this is only carried out when the driver actuates the brake pedal when the vehicle is at a standstill. However, this often does not take place if a hillholder function and/or an autohold function is/are active, since then the vehicle is kept automatically at a standstill without actuation of the brake pedal. If, however, a hillholder function or an autohold function is constantly activated, this disadvantageously has the effect that a test mode for the pneumatic backup brake circuit is never implemented.

Therefore, solutions for carrying out the test mode already before the activation of a hillholder or autohold function have been proposed. However, this has the effect of delaying an activation of the hillholder or autohold function, which has an adverse impact on operability and customer satisfaction.

A brake system of the type in question is discussed for example in DE 10 2015 110 386 A1. There, it is decided on the basis of a criterion whether the intact electrical brake circuit or the pneumatic backup brake circuit provided as an underlying safety level is used for brake pressure control.

SUMMARY OF THE INVENTION

Against this background, an object of the invention is to develop an electropneumatic brake system (EBS) of a vehicle of the type mentioned at the beginning, which electronically controls a brake pressure, in such a way that checking of the pneumatic brake circuit is ensured. Furthermore, a vehicle having such a brake system is also to be made available.

This object may be achieved by the devices characterized and described herein.

Further advantageous refinements and developments of the invention are provided by the further descriptions herein.

The invention is based on an electropneumatic brake system (EBS) of a vehicle, which electronically controls a brake pressure, having a) a service brake actuating element, which can be actuated by a driver, of a service brake actuating device, which has an electrical channel and at least one pneumatic channel, wherein, depending on the actuation of the service brake actuating element, an electrical brake request signal, representing a setpoint brake pressure, is generated in the electrical channel and a pneumatic backup pressure is generated in the pneumatic channel, b) a first electronic control system, which, depending on a brake request signal output by the electrical channel, outputs an electrical brake control signal, c) at least one electropneumatic pressure control module, which, depending on the electrical brake control signal, outputs an actual brake pressure, in the course of a brake pressure control adjusts the actual brake pressure to the setpoint brake pressure and inputs this into at least one pneumatic brake actuator, wherein d) the pressure control module includes at least one electromagnetic control valve device, at least one relay valve, at least one electromagnetic backup solenoid valve, a second electronic control system and at least one pressure sensor, wherein, depending on the electrical brake control signal, the electromagnetic control valve device generates a control pressure for a control input of the relay valve, which, depending on the control pressure, generates an actual brake pressure for the at least one pneumatic brake actuator, which the pressure sensor measures and reports to the second electronic control system of the pressure control module, and wherein e) the electromagnetic control valve device and the at least one electromagnetic backup solenoid valve are electrically controlled by the second electronic control system, and wherein f) the electromagnetic backup solenoid valve is connected by an input to the pneumatic channel and by an output to the control input of the relay valve and can be switched between a pass-through position, in which the input is connected to the output, and a shut-off position, in which the input is shut off with respect to the output, and wherein g) the electromagnetic control valve device connects the control input of the relay valve to a pressure sink or to a compressed air supply or shuts it off from the pressure sink and from the compressed air supply, and wherein h) a pneumatic backup brake circuit of the electropneumatic brake system includes at least the pneumatic channel of the service brake actuating device, the relay valve, the at least one electromagnetic backup solenoid valve and also at least one pneumatic line connecting the at least one pneumatic channel to the input of the electromagnetic backup solenoid valve, and wherein i) an electrical brake circuit of the electropneumatic brake system includes at least the electrical channel of the service brake actuating device, the first electronic control system, the second electronic control system, the electromagnetic control valve device, the at least one electromagnetic backup solenoid valve, the relay valve and the pressure sensor.

The pneumatic backup brake circuit and the electrical brake circuit of the electropneumatic brake system may partially overlap one another. For example, because of the functionality that it provides the backup pressure in its deenergized pass-through position and does not provide it in its energized shut-off position, on the one hand the electromagnetic backup solenoid valve can be assigned to the pneumatic backup brake circuit and on the other hand, because of its electromagnetic properties, it can however also be assigned to the electrical brake circuit. The same also applies to the relay valve, which is controlled both by an electrically by the electromagnetic control valve device and purely pneumatically by the backup pressure.

According to the invention, it is provided that j) test routines of a test mode that are configured that the following test mode conditions are cumulatively satisfied when the electrical brake circuit is intact and the test mode is activated are implemented in the first electronic control system and/or in the second electronic control system:

j1) when a vehicle is being driven, the service brake actuating device is actuated by the driver in such a way that a partial braking, deviating from emergency braking or full braking, is carried out, and j2) a difference between the backup pressure generated in the pneumatic channel and a first pressure value (T1) is greater than the actual brake pressure measured by the at least one pressure sensor, k) the brake pressure control ends and the electromagnetic control valve device and the electromagnetic backup solenoid valve are switched into a test switching state, in which the control input of the relay valve is shut off by the electromagnetic control valve device both from the compressed air supply and from the pressure sink and the electromagnetic backup solenoid valve is switched from the shut-off position into the pass-through position, and if then l) the pressure gradient of the brake pressure measured by the at least one pressure sensor l1) is greater than zero, a first signal, representing an intact backup brake circuit, is generated, or l2) is equal to zero or less than zero, a second signal, representing a defective backup brake circuit, is generated, or m) a difference between the backup pressure generated in the pneumatic channel and a second pressure value (T2) is greater than the actual brake pressure measured by the pressure sensor, the second signal, representing a defective backup brake circuit, is generated.

The test mode conditions may be configured that the actuation of the service brake actuating element by the driver takes place at least for such a time until the first signal or the second signal has been generated. Otherwise, the test mode is ended.

A fundamental test mode condition for performing the test routines of the test mode is therefore that, when a vehicle is being driven, i.e. at a vehicle speed greater than zero, the service brake actuating element, i.e. the brake pedal of the service brake actuating device, is actuated by the driver in order to generate a backup pressure in the pneumatic backup brake circuit, and consequently also in the pneumatic lines between the pneumatic channel of the service brake actuating element and the at least one pressure control module and a possibly present trailer control module.

The information concerning the vehicle speed originates for example from wheel speed sensors of the vehicle, which are for example assigned to a brake-slip control and/or a traction control of the brake system.

A further fundamental test mode condition is the occurrence of adaptive braking, i.e. a partial braking, deviating from emergency or full braking, in which a braking or brake force that is less than the maximum braking or brake force resulting from emergency or full braking is achieved. During such adaptive or partial braking initiated by the driver, it can be assumed after a certain time in which relatively moderate braking takes place, and an only slight wheel slip indicates a high friction coefficient between the wheels and the roadway, that the braking is "uncritical".

According to a further fundamental test mode condition, the difference between the backup pressure generated in the pneumatic channel and a first pressure value T1 must be greater than the actual brake pressure measured by the at least one pressure sensor, which then corresponds to the brake pressure electrically output at that moment. This is usually the case when the vehicle is empty or is carrying little load, because then the brake pressure generated in the electrical brake circuit is relatively low because of the load-dependent brake pressure control that is generally present in an EBS. The first pressure value T1 is for example dependent on tolerances and/or on aging-related wear of the service brake valve assigned to the pneumatic channel of the service brake actuating device.

The (setpoint) backup pressure corresponding to the momentary pedal position of the service brake actuating element is for example generally known in the first electronic control system, for example from the characteristics stored there. Alternatively, the backup pressure could also be measured by an additional pressure sensor, which is then for example arranged in the pneumatic backup line between the pneumatic channel of the service brake actuating device and the pressure control module.

An additional test mode condition for carrying out the test routines of the test mode can also be used the occurrence of a stable driving state. For establishing a stable driving state, setpoint values or setpoint value ranges that must occur, and under which a stable driving state is ensured, may be prescribed for the steering wheel angle, for example driving straight ahead, or for the yaw rate and/or for the transversal acceleration.

The test routines of the test mode may be configured so that they end the test mode if at least one of the aforementioned test mode conditions is not satisfied.

If at least the fundamental test mode conditions are satisfied, then the brake pressure control taking place within the electrical brake circuit is ended while the partial braking initiated by the driver is in progress, and the electromagnetic backup solenoid valve, held until then in the shut-off position, is switched into its pass-through position. In other words, when the test mode is active or activated while partial braking is in progress, the partial braking begun by the electrical brake circuit and under brake pressure control is continued, but no longer by the electrical brake circuit under brake pressure control but exclusively by the pneumatic backup brake circuit. Therefore, in test mode, while partial braking is in progress, a complete switchover takes place from the electrical brake circuit to the pneumatic backup brake circuit.

Since the brake pressure control is ended and the electromagnetic control valve device and the electromagnetic backup solenoid valve are switched into a test switching state in which the control input of the relay valve is shut off both from the compressed air supply and from the pressure sink by the electromagnetic control valve device and the electromagnetic backup solenoid valve has been switched from the shut-off position into the pass-through position, then exclusively the backup pressure of the pneumatic backup brake circuit is available at the control input, and consequently in the control chamber of the relay valve, for continuing the partial braking. On the other hand, the brake pressure that was generated by the electrical brake circuit upon initiation of the partial braking is (still) available in the working chamber or at the working output of the relay valve.

Therefore, at a time before the adoption of the test switching state of the backup solenoid valve and of the electromagnetic control valve device, the brake pressure control was still active, because the partial braking is then still carried out by the electrical brake circuit. After that, a pressure equalization takes place between the control chamber of the relay valve of the pressure control module and the pneumatic backup brake circuit, wherein the pressure reaction in the working chamber of the relay valve, which is measured by the pressure sensor of the pressure control module, allows conclusions to be drawn concerning the state of the pneumatic backup brake circuit or concerning the level of the backup pressure carried therein:

If the brake pressure falls (significantly), which corresponds to a negative pressure gradient, the backup pressure is too low, for example because of a leakage in the pneumatic backup brake circuit.

If the brake pressure rises (significantly), which corresponds to a positive pressure gradient, the backup pressure is sufficient, so that then an intact pneumatic backup brake circuit without leakages can be assumed.

If, on the other hand, the brake pressure is unchanged, a blockage in the pneumatic backup brake circuit can be assumed, in particular whenever a difference between the backup pressure and the measured actual brake pressure is (significantly) greater than the hysteresis of the relay valve of the pressure control module.

If a (great) negative pressure gradient in the pneumatic brake circuit indicates a great leakage, the backup solenoid valve is switched as quickly as possible into its shut-off position again, in order to prevent a loss of brake force while the partial braking is still in progress.

Generation of the second signal in the course of the test routines therefore indicates leakages or blockages in the pneumatic brake circuit, wherein the second signal may then be optically and/or acoustically brought to the attention of the driver by an indicating device as an error message, in order to have the fault or faults eliminated at a workshop.

The overflowing of the higher brake pressure, generated in the electrical brake circuit, in the pressure control module to the pneumatic backup line has the consequence of a small change in the brake force, which is dependent on the pressure, hysteresis, brake factor, etc., and which may lead to a small change in the braking. This small change can however easily be compensated by the driver by a slight re-actuation of the brake pedal while the partial braking is in progress.

In order to avoid a jolt possibly occurring when switching over from braking with the electrical brake circuit under brake pressure control to braking with the pneumatic backup brake circuit during partial braking, the carrying out or activating of the test mode may also be synchronized with a gear shift of a manual or automatic transmission.

The test mode does not require any additional actions, such as for example actuation of the brake pedal shortly after switching on the ignition or waiting for longer while the vehicle is at a standstill with the brake pedal actuated, which may lead to negative acceptance by the driver.

By contrast, the advantage of the measures according to the invention is that the test mode is performed while the vehicle is being driven and during a normal action, i.e. actually only intended for partial braking, without the performance of the test mode being influenced by automatic holding functions or braking interventions initiated without involvement of the driver, for example by driver assistance systems.

Advantageous developments and improvements of the invention specified herein are possible by the measures set out in the further descriptions herein.

The first pressure value T1 and the second pressure value T2 may represent values that are dependent on tolerances of the at least one pneumatic channel of the service brake actuating device. Furthermore, the first pressure value T1 and the second pressure value T2 may be dependent on an actuation of the service brake actuating device, or however also be constants. In particular, the second pressure value T2 may be greater than the first pressure value T1.

According to a development, the first electronic control system and/or the second electronic control system may be configured that the backup pressure generated in the pneumatic channel is determined on the basis of a prescribed and stored backup pressure characteristic, which represents the dependence of the backup pressure on the actuation of the service brake actuating element of the service brake actuating device.

Furthermore, the electrical channel of the service brake actuating device may have a sensor device, which senses the actuation of the actuating element of the service brake actuating device and generates the electrical brake request signal corresponding to the actuation of the service brake actuating element.

The electromagnetic control valve device may comprise at least one electromagnetic outlet valve and at least one electromagnetic inlet valve, for example configured in each case as a 2/2-way solenoid valve. However, the electromagnetic control valve device may be configured as desired and for example also comprise a 3/2-way solenoid valve or an electrical proportional valve, as long as it can only modulate the control pressure at the control input of the relay valve in order to generate a corresponding brake pressure at the working output or in the working chamber of the relay valve. At the same time, it must be possible to prevent influencing of the control input of the relay valve by the electromagnetic control valve device, in order to be able in the course of the test mode to switch over from the electrical brake circuit (completely) to the pneumatic backup brake circuit.

In particular, the test mode may be activated automatically, for example after a specific number of (partial) braking operations or else when there is a specific, for example with the first partial braking after the switching on of the ignition and/or also for instance by an actuation of a (separate) test mode actuating element.

The test routines of the test mode may be configured so that, at a time after generation of the first signal or the second signal, they switch the electromagnetic backup solenoid valve back from the pass-through position into the shut-off position, activate the brake pressure control again and end the test mode.

As already indicated above, the first signal and/or the second signal can be stored in a memory and/or can be read out and/or can be indicated on an indicating device.

Furthermore, the first electronic control system may be a central electronic control system of the overall brake system, which communicates with the second (local) electronic control system of the at least one pressure control module. Then, depending on the brake request signal, the central electronic control system in each case activates the second electronic control system of a number of pressure control modules of the brake system by way of individually generated brake control signals, in which further items of information obtained by way of sensors are contained, such as for example axle load information of the axle concerned, on which the pressure control module concerned or the pressure control modules concerned is/are arranged.

The invention also relates to a vehicle, in particular a commercial vehicle, having a brake system described herein.

The invention is now explained by way of example on the basis of an exemplary embodiment with reference to the accompanying drawings.

DETAILED DESCRIPTION

Figure 1:
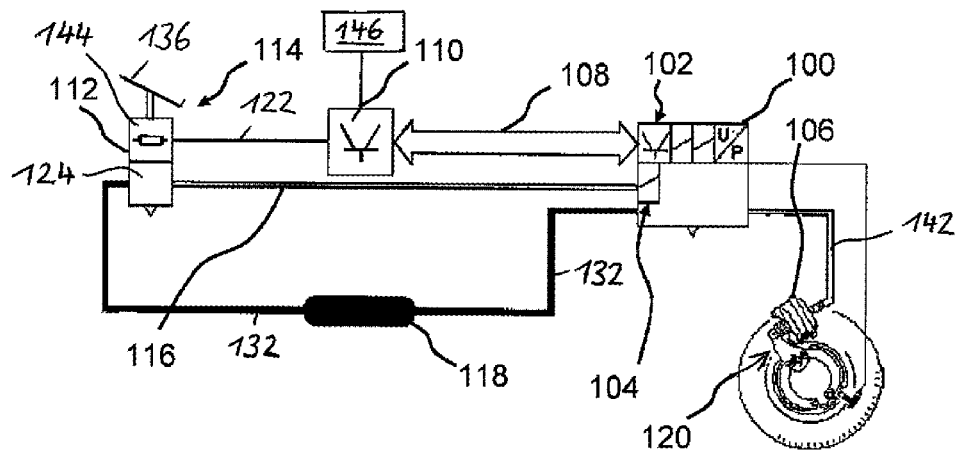
FIG. 1 shows a schematic representation of an electropneumatic brake system (EBS) of a vehicle, which electronically controls a brake pressure, according to an exemplary embodiment.

FIG. 1 schematically shows an electropneumatic brake system (EBS) of a commercial vehicle, which electronically controls a brake pressure, according to an exemplary embodiment. The brake system includes an electropneumatic pressure control module 100 having a second electronic control system 102 and an electromagnetic control valve device 104 for the open-loop and closed-loop control of a brake pressure for a pneumatic brake actuator 106 of the vehicle.

The second electronic control system 102 is configured to adjust the brake pressure in accordance with a setpoint value, which, according to this exemplary embodiment, the second electronic control system 102 obtains by way of a braking CAN 108 from a central first electronic control system 110 (EBS_ECU) of the brake system (EBS). The first electronic control system 110 is connected by way of an electrical line 122 to a setpoint value sensor 112 of an electrical channel 144 of a foot brake module 114 of the commercial vehicle. In this way, a brake request requested by the driver of the vehicle by way of the foot brake module 114 can be sensed by the setpoint value sensor 112 and passed on by way of the electrical line 122 as a brake request signal into the first electronic control system 110 and from there passed on as a brake control signal by way of the braking CAN 108 to the second electronic control system 102 of the pressure control module 100. The second electronic control system 102 is configured to output a brake pressure, corresponding to the brake control signal, for the brake actuator 106, which takes the form here for example of a pneumatic brake cylinder which applies or releases a wheel brake 120.

The foot brake module 114 is connected by way of a pneumatic backup line 116 to an input 134 of a backup solenoid valve BV of the pressure control module 100. In the event of a fault, a switchover is made from a normal operating mode, in which the brake pressure is provided by using the second electronic control system 102 and the electromagnetic control device 104, into a backup operating mode, in which a pneumatic setpoint value transmission takes place directly from a pneumatic channel 124 of the foot brake module 114 to the pressure control module 100.

Also shown in FIG. 1 is a compressed air reservoir 118 for providing a supply pressure, from which the backup pressure for the pneumatic brake actuator is generated in the pneumatic channel 124 of the foot brake module 114. The pneumatic channel 124 of the foot brake module 114 contains for this purpose a pneumatic-mechanical service brake valve known per se.

Figure 2:
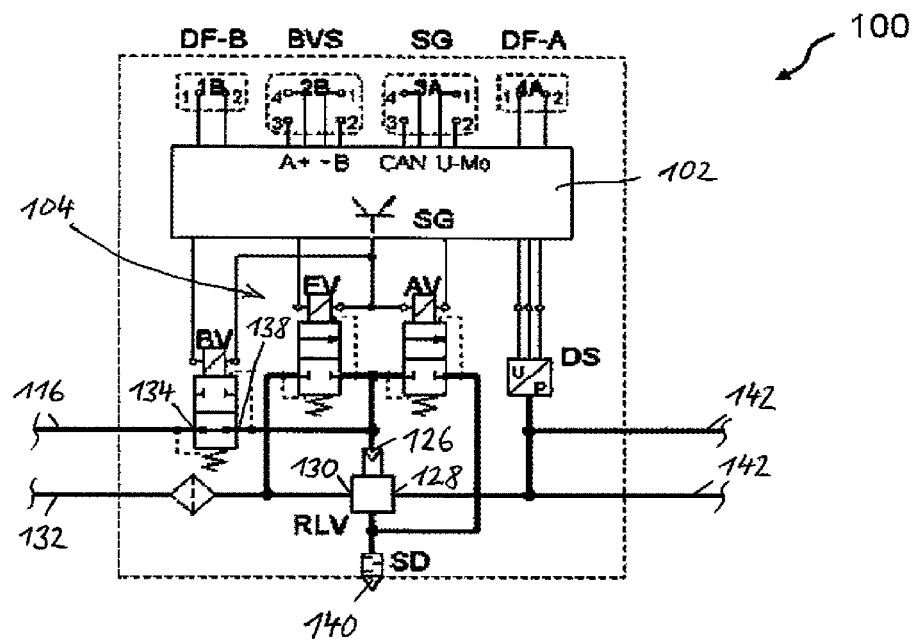
FIG. 2 shows a schematic representation of a pressure control module of the brake system (EBS) from FIG. 1.

According to the exemplary embodiment shown in FIG. 2, the electropneumatic pressure control module 100 has a relay valve RLV, which has a control input 126, leading to a control chamber not shown here, a working output 128, connected to a working chamber, and also a supply input 130, which in turn is connected by way of a supply line 132 to the compressed air reservoir 118.

On the other hand, the pressure control module 100 also includes the electromagnetic backup solenoid valve BV, the input 134 of which is connected to the pneumatic backup line 116, in which the backup pressure carried by the pneumatic channel 124 in the service brake valve is available when a brake pedal 136 of the foot brake module 114 is actuated. The pneumatic channel 124 is then connected on the input side to the supply line 132 and on the output side to the pneumatic backup line 116.

An output 138 of the backup solenoid valve BV is connected to the control input 126 of the relay valve RLV, to which likewise an inlet solenoid valve EV and an outlet solenoid valve AV of the electromagnetic control valve device 104 are pneumatically connected.

The electromagnetic control valve device 104 therefore contains here for example a combination of an inlet solenoid valve EV and an outlet solenoid valve AV, configured in each case as a 2/2-way solenoid valve, which have switching positions in which the control input 126 of the relay valve RLV is either connected to a pressure sink SD, of the supply line 132, or such a connection is shut off. The electromagnetic control valve device EV, AV and also the backup solenoid valve BV are electrically controlled by the second electronic control system 102.

Furthermore, the working output 128 of the relay valve RLV is in connection on the one hand with a pressure sensor DS, which inputs an electrical signal corresponding to the brake pressure measured there into the second electronic control system 102. On the other hand, the working output 128 of the relay valve RLV is connected to brake pressure lines 142, one brake pressure line 142 of which respectively introduces or extracts air into or from a brake actuator 106. A pressure control module 100 may however also introduce or extract air into or from just a single brake actuator 106.

Whether the brake pressure available in the brake pressure line 142 is electrically controlled or pneumatically controlled is determined by the switching position of the backup solenoid valve BV, which, as shown in FIG. 2, when deenergized in its pass-through position connects its input 134 to its output 138 and when energized shuts off this connection in a shut-off position.

If, therefore, the backup solenoid valve BV is in its energized shut-off position, the backup pressure carried in the backup line 116 is shut off with respect to the control input 126 of the relay valve RLV. Then, the actual brake pressure in the working chamber of the relay valve RLV, which is measured by the pressure sensor DS, is electrically adjusted to the setpoint brake pressure, which is formed on the basis of the brake control signal input into the second electronic control system 102. For this purpose, the second electronic control system 102 activates the inlet solenoid valve EV and the outlet solenoid valve AV correspondingly. The relay valve RLV then modulates a correspondingly boosted brake pressure from the control pressure available at its control input 126 in its working chamber and at its working output.

Altogether, there is therefore a pneumatic backup brake circuit of the electropneumatic brake system, which includes at least the pneumatic channel 124 of the foot brake module 114, the relay valve RLV, the backup solenoid valve BV and also the pneumatic backup line 116.

Furthermore, there is an electrical brake circuit of the electropneumatic brake system, which includes the electrical channel 144 of the foot brake module 114, the first electronic control system 110, the second electronic control system 102, the electromagnetic control valve device EV, AV, the relay valve RLV and the pressure sensor DS.

In normal braking operation, the electrical brake circuit is prioritized, because it makes the brake pressure control described above available. If, however, the primary electrical brake circuit fails, for example in the event of a power failure or a fault in the first electronic control system and/or in the second electronic control system, the backup solenoid valve BV is no longer energized and switches over in a spring-loaded manner from the energized shut-off position into its pass-through position. Then, the control input 126 of the relay valve RLV is acted on directly by the backup pressure carried in the backup line 116, so that then the brake pressure output at the working output 128 of the relay valve RLV is derived from the backup pressure carried in the pneumatic backup brake circuit. A brake pressure control is then no longer possible however.

Ttest routines of a test mode may be implemented in the first electronic control system. These test routines are performed if at least the following test mode conditions are cumulatively satisfied:

- when the vehicle is being driven, the foot brake module 114 is actuated by the driver in such a way that a partial braking, deviating from emergency braking or full braking, is carried out, and
- a difference between the backup pressure generated in the pneumatic channel 124 and a first pressure value T1 is greater than the actual brake pressure measured by the pressure sensor DS.

If at least these test mode conditions are satisfied, then the brake pressure control taking place within the electrical brake circuit is ended and the electromagnetic control valve device EV, AV and the electromagnetic backup solenoid valve BV are switched into a test switching state, in which the control input 126 of the relay valve RLV is shut off both from the compressed air reservoir 118 and from the pressure sink 140 by the electromagnetic control valve device EV, AV and the electromagnetic backup solenoid valve BV has been switched from the shut-off position into the pass-through position.

If the pressure gradient of the brake pressure measured by the pressure sensor DS is then greater than zero, then a first signal, representing an intact backup brake circuit, is generated. If, however, the pressure gradient of the brake pressure measured by the pressure sensor DS is equal to zero or less than zero, a second signal, representing a defective backup brake circuit, is generated.

If, alternatively, a difference between the backup pressure generated in the pneumatic channel 124 and a second pressure value T2 is greater than the actual brake pressure measured by the pressure sensor DS, the second signal, representing a defective backup brake circuit, is generated.

The test mode conditions may be configured that the actuation of the service brake actuating element by the driver takes place at least for such a time until the first signal or the second signal has been generated. Otherwise, the test mode is ended.

A fundamental test mode condition for performing the test routines of the test mode is therefore that, when a vehicle is being driven, i.e. at a vehicle speed greater than zero, the brake pedal 136 of the foot brake module 114 is actuated by the driver in order to be able to generate a backup pressure in the pneumatic backup brake circuit, and consequently also in the backup line 116 between the pneumatic channel 124 and the pressure control module 100.

The information concerning the vehicle speed originates for example from wheel speed sensors of the vehicle, which are for example assigned to a brake-slip control and/or a traction control of the brake system.

A further fundamental test mode condition is the occurrence of adaptive braking, i.e. a partial braking, deviating from emergency or full braking, in which a braking or brake force that is less than the maximum braking or brake force resulting from emergency or full braking is achieved. During such adaptive or partial braking initiated by the driver, it can be assumed after a certain time in which relatively moderate braking takes place, and an only slight wheel slip indicates a high friction coefficient between the wheels and the roadway, that the braking is "uncritical".

According to a further fundamental test mode condition, the difference between the backup pressure generated in the pneumatic channel 124 and a first pressure value T1 must be greater than the actual brake pressure measured by the at least one pressure sensor DS, which then corresponds to the brake pressure electrically output at that moment. This is usually the case when the vehicle is empty or is carrying little load, because then the brake pressure generated in the electrical brake circuit is relatively low because of the load-dependent brake pressure control that is generally present in an EBS.

Figure 3:
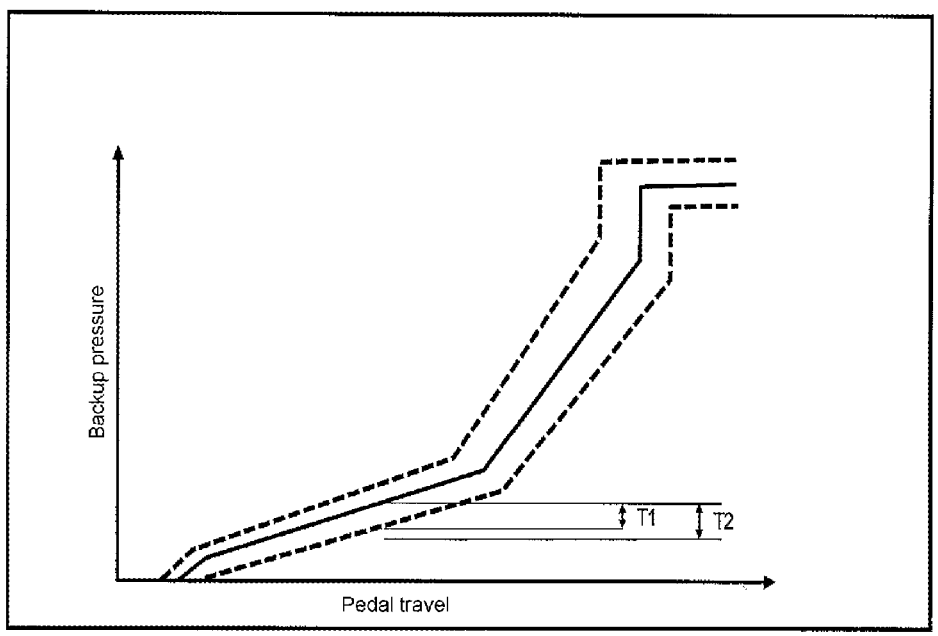
FIG. 3 shows a characteristic in which the dependence of the backup pressure of a pneumatic backup brake circuit of the brake system (EBS) according to FIG. 1 on the pedal travel is represented.

FIG. 3 shows a characteristic in which the dependence of the backup pressure of the pneumatic backup brake circuit on the pedal travel or on the pedal angle is represented. The first pressure value T1, which is for example dependent on tolerances and/or on aging-related wear of the service brake valve assigned to the pneumatic channel 124 of the foot brake module 114 and also on tolerances and hysteresis, can be seen there. The line depicted as a solid line in FIG. 3 represents for example the characteristic of a not yet worn service brake valve and the lines depicted as dashed lines represent the characteristics of a service brake valve that has a certain amount of wear.

The (setpoint) backup pressure corresponding to the momentary pedal position of the brake pedal 136 is for example known in the first electronic control system 110, for example from the characteristic stored there according to FIG. 3.

An additional test mode condition for carrying out the test routines of the test mode can also be used the occurrence of a stable driving state. For establishing a stable driving state, setpoint values or setpoint value ranges that must occur, and under which a stable driving state is ensured, may be prescribed for the steering wheel angle, for example driving straight ahead, or for the yaw rate and/or for the transversal acceleration. The corresponding data are obtained on the basis of sensors and likewise input into the first electronic control system 102.

The test routines of the test mode may be configured so that they end the test mode if at least one of the aforementioned test mode conditions is not satisfied.

If at least the fundamental test mode conditions are satisfied, then the brake pressure control taking place within the electrical brake circuit is ended while the partial braking initiated by the driver is in progress, and the electromagnetic backup solenoid valve BV, held until then in the shut-off position, is switched into its pass-through position. In other words, when the test mode is active or activated while partial braking is in progress, the partial braking begun by the electrical brake circuit and under brake pressure control is continued, but no longer by the electrical brake circuit under brake pressure control but exclusively by the pneumatic backup brake circuit. Therefore, in test mode, while partial braking is in progress, a complete switchover takes place from the electrical brake circuit to the pneumatic backup brake circuit.

By contrast with the fault-induced switchover described above from the electrical brake circuit to the pneumatic backup brake circuit, in the course of the test mode such a switchover does not take place on account of a fault in the electrical brake circuit but only for the purpose of testing whether the pneumatic backup brake circuit is available and operational. In the test mode, it is therefore assumed that the electrical brake circuit does not have any faults.

Since the brake pressure control is ended and the electromagnetic control valve device EV, AV and the electromagnetic backup solenoid valve BV are switched into a test switching state in which, as shown in FIG. 2, the control input of the relay valve is shut off both from the compressed air reservoir 118 and from the pressure sink 140 by the electromagnetic control valve device EV, AV and the electromagnetic backup solenoid valve BV has been switched from the shut-off position into the pass-through position, then exclusively the backup pressure of the pneumatic backup brake circuit is available at the control input 126, and consequently in the control chamber of the relay valve RLV, for continuing the partial braking. On the other hand, the brake pressure that was generated by the electrical brake circuit upon initiation of the partial braking is (still) available in the working chamber or at the working output of the relay valve.

Therefore, at a time before the adoption of the test switching state of the backup solenoid valve BV and of the electromagnetic control valve device EV, AV, the brake pressure control was still active, because the partial braking is then still carried out by the electrical brake circuit.

After that, a pressure equalization takes place between the control chamber of the relay valve RLV of the pressure control module 100 and the pneumatic backup brake circuit, wherein the pressure reaction in the working chamber of the relay valve RLV, which is measured by the pressure sensor DS of the pressure control module 100, allows conclusions to be drawn concerning the state of the pneumatic backup brake circuit or concerning the level of the backup pressure carried therein:

- If the brake pressure falls (significantly), which corresponds to a negative pressure gradient, the backup pressure is too low, for example because of a leakage in the pneumatic backup brake circuit.
- If the brake pressure rises (significantly), which corresponds to a positive pressure gradient, the backup pressure is sufficient, so that then an intact pneumatic backup brake circuit without leakages can be assumed.
- If, on the other hand, the brake pressure is unchanged, a blockage in the pneumatic backup brake circuit can be assumed, in particular whenever a difference between the backup pressure and the measured actual brake pressure is (significantly) greater than the hysteresis of the relay valve RLV of the pressure control module 100.

If a (great) negative pressure gradient in the pneumatic brake circuit indicates a great leakage, the backup solenoid valve BV is switched as quickly as possible into its shut-off position again, in order to prevent a loss of brake force while the partial braking is still in progress.

Generation of the second signal in the course of the test routines therefore indicates leakages or blockages in the pneumatic brake circuit, wherein the second signal may then be optically and/or acoustically brought to the attention of the driver by an indicating device 146 as an error message, in order to have the fault or faults eliminated at a workshop.

The overflowing of the higher brake pressure, generated in the electrical brake circuit, in the pressure control module 100 to the pneumatic backup line 116 has the consequence of a small change in the brake force, which is dependent on the pressure, hysteresis, brake factor, etc., and which may lead to a small change in the braking. This small change can however easily be compensated by the driver by a slight re-actuation of the brake pedal 136 while the partial braking is in progress.

In order to avoid a jolt possibly occurring when switching over from braking with the electrical brake circuit under brake pressure control to braking with the pneumatic backup brake circuit during partial braking, the carrying out or activating of the test mode may also be synchronized with a gear shift of a manual or automatic transmission.

Figure 4:
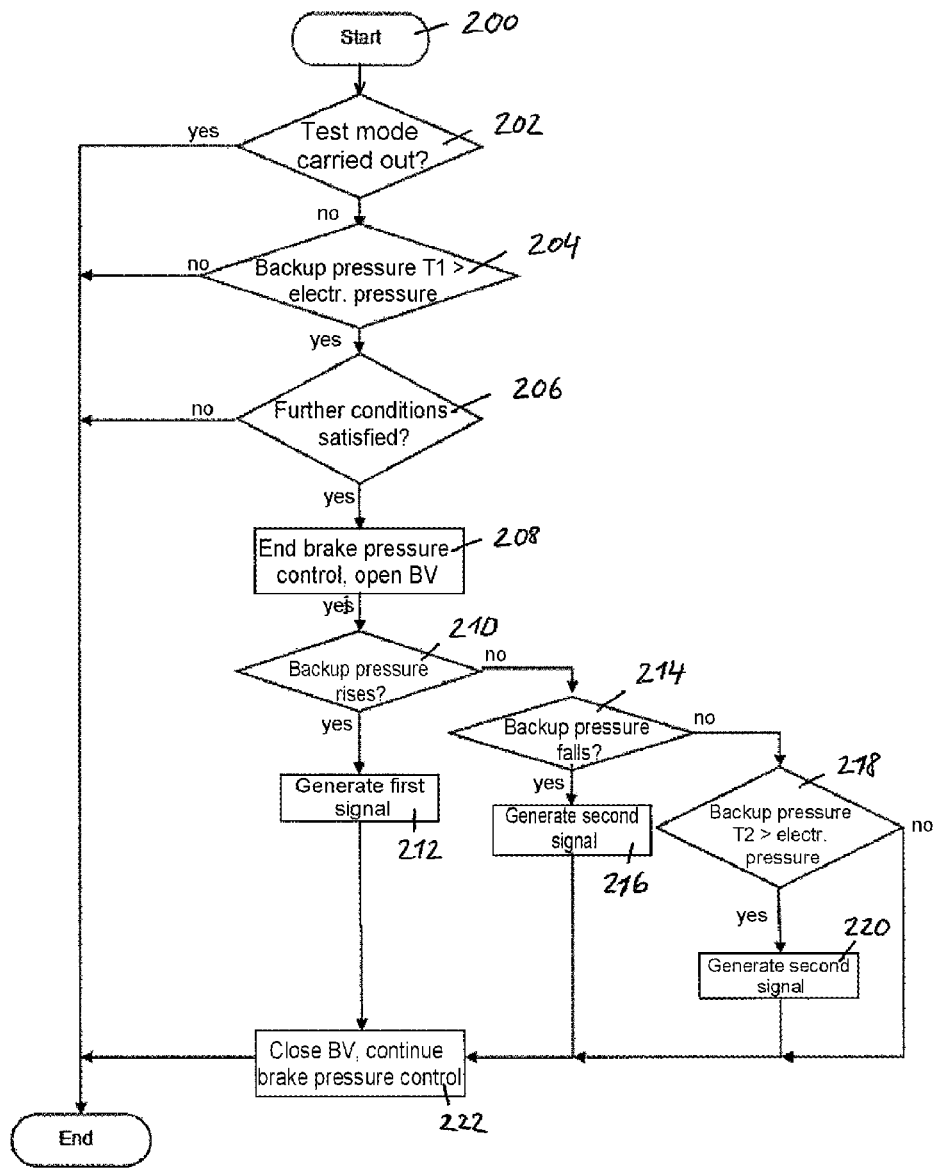
FIG. 4 shows a flow diagram of a test routine of a test mode for testing the pneumatic backup brake circuit of the brake system (EBS) from FIG. 1.

FIG. 4 shows the sequence of the test routine of the test mode according to an exemplary embodiment.

In step 200 (start), the test mode is activated for example after a specific number of (partial) braking operations or else when there is a specific, for example with the first partial braking after the switching on of the ignition and/or also for instance by an actuation of a (separate) test mode actuating element.

In step 202, it is then inquired whether the test mode has already been run through, for example within a specific past time period or after the switching on of the ignition. If this is the case, the test mode is ended (end).

Otherwise, it is checked on the basis of test mode conditions in step 204 whether, when a commercial vehicle is being driven, the brake pedal 136 was actuated by the driver in such a way that a partial braking, deviating from emergency braking or full braking, is carried out, and furthermore whether a difference between the backup pressure generated in the pneumatic channel and the first pressure value T1 is greater than the actual brake pressure measured by the pressure sensor DS. If this is not the case, the test mode is ended (end). Otherwise, still further test mode conditions may optionally be tested in step 206, for example whether a stable driving state occurs. For establishing a stable driving state, setpoint values or setpoint value ranges that must occur, and under which a stable driving state is ensured, may be prescribed for the steering wheel angle, for example driving straight ahead, or for the yaw rate and/or for the transversal acceleration. If these further test mode conditions are not satisfied, the test mode is ended (end).

If, on the other hand, all of the test mode conditions are satisfied, the brake pressure control in the electrical brake circuit that is still performed at the beginning of the partial braking is ended in a subsequent step 208 by the electromagnetic control valve device 104, here in the form of the inlet solenoid valve EV and the outlet solenoid valve AV, disconnecting the control input 126 of the relay valve RLV both from the compressed air reservoir 118 and from the pressure sink 140, and then switching the backup solenoid valve BV from the previous shut-off position into the pass-through position, as shown in FIG. 2.

In a subsequent step 210, it is checked whether the brake pressure measured by the pressure sensor DS rises, which corresponds to a positive pressure gradient. If this is the case, the backup pressure is considered to be sufficient, so that then an intact pneumatic backup brake circuit without leakages can be assumed. Then, the first signal, which represents an intact pneumatic backup brake circuit, is generated in a step 212.

If this is not the case, however, the branch is taken to a step 214, in which it is inquired whether the brake pressure measured by the pressure sensor DS falls (significantly), which corresponds to a negative pressure gradient. If this is the case, it is assumed that the backup pressure is too low, for example because of a leakage in the pneumatic backup brake circuit. Then, the second signal, which represents a defective pneumatic backup brake circuit, is generated in a step 216.

If this is not the case, however, the branch is taken to a step 218, in which it is inquired whether a difference between the backup pressure generated in the pneumatic channel 124 and the second pressure value T2 is greater than the actual brake pressure measured by the pressure sensor DS. The second pressure value T2 is for example likewise dependent on the state of wear of the service brake valve in the pneumatic channel 124 and also on tolerances and hysteresis. If this is the case, the second signal, which represents a defective backup brake circuit, is generated in a subsequent step 220.

After the case-specific generation of the first signal or the second signal, the backup solenoid valve BV is switched back from the pass-through position into its shut-off position in a step 222, and the brake pressure control is continued within the electrical circuit.

All of steps 200 to 222 of the test routine of the test mode may be carried out within a single partial braking or adaptive braking.

The List of reference signs is as follows:
100 Electro-pneumatic pressure control module
102 Second electronic control system
104 Electromagnetic control device
106 Brake actuator
108 Braking CAN
110 First electronic control system
112 Setpoint value sensor
114 Foot brake module
116 Pneumatic backup line
118 Compressed air reservoir
120 Wheel brake
122 Electrical line
124 Pneumatic channel
126 Control input
128 Working output
130 Supply input
132 Supply line
134 Input
136 Brake pedal
138 Output
140 Pressure sink
142 Brake pressure line
144 Electrical channel
146 Indicating device

The invention claimed is:

1. An electropneumatic brake system (EBS) of a vehicle, which electronically controls a brake pressure, comprising:
a) a service brake actuating element, which is actuatable by a driver, of a service brake actuating device, which has an electrical channel and at least one pneumatic channel, wherein, depending on the actuation of the service brake actuating element, an electrical brake request signal, representing a setpoint brake pressure, is generated in the electrical channel and a pneumatic backup pressure is generated in the pneumatic channel;
b) a first electronic control system, which, depending on a brake request signal output by the electrical channel, outputs an electrical brake control signal;
c) at least one electropneumatic pressure control module, which, depending on the electrical brake control signal, outputs an actual brake pressure, in the course of a brake pressure control adjusts the actual brake pressure to the setpoint brake pressure and inputs this into at least one pneumatic brake actuator;
d) wherein the pressure control module includes at least one electromagnetic control valve device (EV, AV), at least one relay valve (RLV), at least one electromagnetic backup solenoid valve (BV), a second electronic control system and at least one pressure sensor (DS), wherein, depending on the electrical brake control signal, the electromagnetic control valve device (EV, AV) generates a control pressure for a control input of the relay valve (RLV), which, depending on the control pressure, generates an actual brake pressure for the at least one pneumatic brake actuator, which the pressure sensor (DS) measures and reports to the second electronic control system of the pressure control module,
e) wherein the electromagnetic control valve device (EV, AV) and the at least one electromagnetic backup solenoid valve (BV) are electrically controlled by the second electronic control system,
f) wherein the electromagnetic backup solenoid valve (BV) is connected by an input to the pneumatic channel and by an output to the control input of the relay valve (RLV) and can be switched between a pass-through position, in which the input is connected to the output, and a shut-off position, in which the input is shut off with respect to the output,
g) wherein the electromagnetic control valve device (EV, AV) connects the control input of the relay valve (RLV) to a pressure sink or to a compressed air supply or shuts it off from the pressure sink and from the compressed air supply,
h) wherein a pneumatic backup brake circuit of the electropneumatic brake system includes at least the pneumatic channel of the service brake actuating device, the relay valve (RLV), the at least one electromagnetic backup solenoid valve (BV) and also at least one pneumatic line connecting the at least one pneumatic channel to the input of the at least one electromagnetic backup solenoid valve (BV), and
i) wherein an electrical brake circuit of the electropneumatic brake system includes at least the electrical channel of the service brake actuating device, the first electronic control system, the second electronic control system, the electromagnetic control valve device (EV, AV), the at least one electromagnetic backup solenoid valve (BV), the relay valve (RLV) and the pressure sensor (DS),
j) wherein test routines of a test mode that are configured so that the following test mode conditions are cumulatively satisfied when the electrical brake circuit is intact and the test mode is activated are implemented in the first electronic control system and/or in the second electronic control system:
j1) when a vehicle is being driven, the service brake actuating device is actuated by the driver so that a partial braking, deviating from emergency braking or full braking, is carried out, and
j2) a difference between the backup pressure generated in the pneumatic channel and a first pressure value is greater than the actual brake pressure measured by the at least one pressure sensor (DS),
k) wherein the brake pressure control ends and the electromagnetic control valve device (EV, AV) and the electromagnetic backup solenoid valve (BV) are switched into a test switching state, in which the control input of the relay valve (RLV) is shut off by the electromagnetic control valve device (EV, AV) both from the compressed air supply and from the pressure sink and the electromagnetic backup solenoid valve (BV) is switched from the shut-off position into the pass-through position, and l) if the pressure gradient of the brake pressure measured by the at least one pressure sensor (DS)
   l1) is greater than zero, a first signal, representing an intact backup brake circuit, is generated, or
   l2) is equal to zero or less than zero, a second signal, representing a defective backup brake circuit, is generated, or m) then a difference between the backup pressure generated in the pneumatic channel and a second pressure value is greater than the actual brake pressure measured by the pressure sensor (DS), the second signal, representing a defective backup brake circuit, is generated.

2. The brake system of claim 1, wherein the first pressure value and the second pressure value represent values that are dependent on tolerances, hysteresis and wear.

3. The brake system of claim 2, wherein the first pressure value and the second pressure value are dependent on an actuation of the service brake actuating device.

4. The brake system of claim 1, wherein the second pressure value is greater than the first pressure value.

5. The brake system of claim 1, wherein the first electronic control system and/or the second electronic control system is configured so that the backup pressure generated in the pneumatic channel is determined on the basis of a prescribed and stored backup pressure characteristic, which represents the dependence of the backup pressure on the actuation of the service brake actuating element of the service brake actuating device.

6. The brake system of claim 1, wherein the electrical channel of the service brake actuating device has a sensor device, which senses the actuation of the service brake actuating element of the service brake actuating device and generates the electrical brake request signal corresponding to the actuation of the service brake actuating element.

7. The brake system of claim 1, wherein the electromagnetic control valve device (EV, AV) includes at least one electromagnetic outlet valve (AV) and at least one electromagnetic inlet valve (EV), configured in each case as a 2/2-way solenoid valve.

8. The brake system of claim 1, wherein the test mode can be activated automatically and/or by an actuation of a test mode actuating element.

9. The brake system of claim 1, wherein, at a time before the adoption of the test switching state, the brake pressure control is active.

10. The brake system of claim 9, wherein the test routines are configured so that, at a time after generation of the first signal or the second signal, they switch the electromagnetic backup solenoid valve (BV) back from the pass-through position into the shut-off position, activate the brake pressure control again and end the test mode.

11. The brake system of claim 1, wherein the test routines of the test mode are configured so that they end the test mode if at least one of the test mode conditions is not satisfied.

12. The brake system of claim 1, wherein the first signal and/or the second signal are storable in a memory and/or can be read out and/or are indicatable on an indicating device.

13. The brake system of claim 1, wherein the first electronic control system includes a central electronic control system of the brake system, which communicates with the second electronic control system of the pressure control module.

14. A vehicle, comprising:
an electropneumatic brake system (EBS) of the vehicle, which electronically controls a brake pressure, including:
a) a service brake actuating element, which is actuatable by a driver, of a service brake actuating device, which has an electrical channel and at least one pneumatic channel, wherein, depending on the actuation of the service brake actuating element, an electrical brake request signal, representing a setpoint brake pressure, is generated in the electrical channel and a pneumatic backup pressure is generated in the pneumatic channel;
b) a first electronic control system, which, depending on a brake request signal output by the electrical channel, outputs an electrical brake control signal;
c) at least one electropneumatic pressure control module, which, depending on the electrical brake control signal, outputs an actual brake pressure, in the course of a brake pressure control adjusts the actual brake pressure to the setpoint brake pressure and inputs this into at least one pneumatic brake actuator;
d) wherein the pressure control module includes at least one electromagnetic control valve device (EV, AV), at least one relay valve (RLV), at least one electromagnetic backup solenoid valve (BV), a second electronic control system and at least one pressure sensor (DS), wherein, depending on the electrical brake control signal, the electromagnetic control valve device (EV, AV) generates a control pressure for a control input of the relay valve (RLV), which, depending on the control pressure, generates an actual brake pressure for the at least one pneumatic brake actuator, which the pressure sensor (DS) measures and reports to the second electronic control system of the pressure control module,
e) wherein the electromagnetic control valve device (EV, AV) and the at least one electromagnetic backup solenoid valve (BV) are electrically controlled by the second electronic control system,
f) wherein the electromagnetic backup solenoid valve (BV) is connected by an input to the pneumatic channel and by an output to the control input of the relay valve (RLV) and can be switched between a pass-through position, in which the input is connected to the output, and a shut-off position, in which the input is shut off with respect to the output,
g) wherein the electromagnetic control valve device (EV, AV) connects the control input of the relay valve (RLV) to a pressure sink or to a compressed air supply or shuts it off from the pressure sink and from the compressed air supply,
h) wherein a pneumatic backup brake circuit of the electropneumatic brake system includes at least the pneumatic channel of the service brake actuating device, the relay valve (RLV), the at least one electromagnetic backup solenoid valve (BV) and also at least one pneumatic line connecting the at least one pneumatic channel to the input of the at least one electromagnetic backup solenoid valve (BV), and
i) wherein an electrical brake circuit of the electropneumatic brake system includes at least the electrical channel of the service brake actuating device, the first electronic control system, the second electronic control system, the electromagnetic control valve device (EV, AV), the at least one electromagnetic backup solenoid valve (BV), the relay valve (RLV) and the pressure sensor (DS), j) wherein test routines of a test mode that are configured so that the following test mode conditions are cumulatively satisfied when the electrical brake circuit is intact and the test mode is activated are implemented in the first electronic control system and/or in the second electronic control system:
  j1) when a vehicle is being driven, the service brake actuating device is actuated by the driver so that a partial braking, deviating from emergency braking or full braking, is carried out, and
  j2) a difference between the backup pressure generated in the pneumatic channel and a first pressure value is greater than the actual brake pressure measured by the at least one pressure sensor (DS),
k) wherein the brake pressure control ends and the electromagnetic control valve device (EV, AV) and the electromagnetic backup solenoid valve (BV) are switched into a test switching state, in which the control input of the relay valve (RLV) is shut off by the electromagnetic control valve device (EV, AV) both from the compressed air supply and from the pressure sink and the electromagnetic backup solenoid valve (BV) is switched from the shut-off position into the pass-through position, and
l) if the pressure gradient of the brake pressure measured by the at least one pressure sensor (DS)
  l1) is greater than zero, a first signal, representing an intact backup brake circuit, is generated, or
  l2) is equal to zero or less than zero, a second signal, representing a defective backup brake circuit, is generated, or
m) then a difference between the backup pressure generated in the pneumatic channel and a second pressure value is greater than the actual brake pressure measured by the pressure sensor (DS), the second signal, representing a defective backup brake circuit, is generated.

15. The vehicle of claim 14, wherein the vehicle includes a commercial vehicle.

* * * * *